US006860642B2

(12) United States Patent
Vodrahalli et al.

(10) Patent No.: US 6,860,642 B2
(45) Date of Patent: Mar. 1, 2005

(54) COMPACT OPTICAL PACKAGE WITH MODULAR OPTICAL CONNECTOR

(75) Inventors: Nagesh K. Vodrahalli, Los Altos, CA (US); Jaiom S. Sambyal, Cupertino, CA (US); Biswajit Sur, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 10/099,110

(22) Filed: Mar. 14, 2002

(65) Prior Publication Data

US 2003/0174969 A1 Sep. 18, 2003

(51) Int. Cl.[7] .............................. G02B 6/36; G02B 6/00
(52) U.S. Cl. ........................ 385/53; 385/89; 385/134
(58) Field of Search ........................... 385/53, 134, 12, 385/89; 219/530

(56) References Cited

U.S. PATENT DOCUMENTS

| | | | | |
|---|---|---|---|---|
| 4,597,631 A | * | 7/1986 | Flores | 385/53 |
| 5,104,243 A | * | 4/1992 | Harding | 385/84 |
| 5,412,748 A | * | 5/1995 | Furuyama et al. | 385/95 |
| 5,659,655 A | * | 8/1997 | Pilatos | 385/136 |
| 5,732,173 A | | 3/1998 | Bylander | |
| 5,970,191 A | * | 10/1999 | Oba et al. | 385/47 |
| 5,994,679 A | * | 11/1999 | DeVeau et al. | 219/530 |
| 6,052,500 A | * | 4/2000 | Takano et al. | 385/50 |
| 6,163,639 A | * | 12/2000 | Ollier et al. | 385/52 |
| 6,257,769 B1 | | 7/2001 | Watanabe | |
| 6,295,394 B1 | * | 9/2001 | Arab-Sadeghabadi | 385/12 |
| 6,351,590 B1 | * | 2/2002 | Shahid | 385/134 |
| 6,402,393 B1 | * | 6/2002 | Grimes et al. | 385/89 |
| 6,478,625 B2 | * | 11/2002 | Tolmie et al. | 439/608 |
| 6,485,192 B1 | * | 11/2002 | Plotts et al. | 385/75 |
| 6,547,446 B2 | * | 4/2003 | Yamaguchi | 385/53 |
| 6,556,754 B2 | * | 4/2003 | Simmons et al. | 385/121 |
| 2001/0010742 A1 | | 8/2001 | Nakagawa | |
| 2001/0041034 A1 | | 11/2001 | Sasaki | |
| 2002/0121113 A1 | * | 9/2002 | Gohlke et al. | 65/134.4 |

FOREIGN PATENT DOCUMENTS

| | | |
|---|---|---|
| EP | 0 703 679 A2 | 3/1996 |
| EP | 0 936 485 A1 | 8/1999 |
| EP | 0 703 679 A3 | 12/1999 |
| JP | 2000298219 | 10/2000 |

* cited by examiner

*Primary Examiner*—Chandrika Prasad
(74) *Attorney, Agent, or Firm*—Jay P. Beale

(57) ABSTRACT

An optical connector comprises an optical circuit and a package casing. The package casing has an integrated modular optical connector, which has multiple optical waveguides.

14 Claims, 5 Drawing Sheets

US 6,860,642 B2

COMPACT OPTICAL PACKAGE WITH MODULAR OPTICAL CONNECTOR

BACKGROUND OF THE INVENTION

1. Field of the Invention

The described invention relates to the field of optical circuits. In particular, the invention relates to an optical circuit package having a modular optical connector.

2. Description of Related Art

Optical circuits include, but are not limited to, light sources, detectors and waveguides that provide such functions as splitting, coupling, combining, multiplexing, demultiplexing and/or switching. Planar lightwave circuits (PLCS) are optical circuits that are manufactured and operate in the plane of a wafer. PLC technology is advantageous because it can be used to form many different types of optical devices, such as array waveguide grating (AWG) filters, optical add/drop (de)multiplexers, optical switches, as well as hybrid opto-electronic integrated devices. Such devices formed with optical fibers would typically be much larger or would not be feasible at all. Further, PLC structures may be mass produced on a silicon wafer.

FIG. 1 is a schematic diagram that shows an example of an optical component comprising an optical circuit 10 connected to optical connectors 12 by optical fibers 14. One way to couple the optical fibers 14 to the optical circuit 10, such as a PLC, is through butt-coupling one or more V-groove substrates 20 to the optical circuit 10. The V-groove substrate 20 has multiple optical fibers attached to it that have interspacing to match the interspacing of the waveguides in the optical circuit 10. The optical connectors 12 may be any of numerous optical connectors, such as those shown in FIG. 2.

FIG. 2 is a schematic diagram that shows examples of various types of optical connectors 12, such as FC/PC, ST, Biconic, SMA, D4, etc., that may be used to couple to the optical component 5. Each of the connectors 12 provides a single waveguide interface. In order to operate the optical circuit 10, all of the connectors 12 are coupled to corresponding optical pathways through mating connectors.

A disadvantage of the multiple connectors 12 is that the time to connect each of the connectors 12 may be significant. Additionally, cleaning of each connector 12 before attaching the connector 12 to a mating connector may be required to guarantee a good connection. Because this process is not easily automated, the amount of time for connecting and disconnecting optical components, e.g., for testing, may be significant.

The optical connectors 12 are coupled to the optical circuit 10 and V-groove substrate 12 by up to several feet of optical fibers 14. The optical fibers 14 are fragile, and may be easily damaged. If one of the optical fibers 14 is damaged, or if the V-groove substrate 20 is pulled out of alignment by, e.g., an accidental tug on one of the optical fibers 14, the entire optical component 5 may need to be replaced.

Because the optical fibers 14 are so fragile handling of the optical component 5 must be done very carefully, and it is difficult to automate manufacturing processes without harm to the optical fibers. Additionally, shipping of the optical component is expensive since extra protective precautions are used to ensure that the optical component 5 including the optical fibers 14 is not damaged during transit. This usually entails using large boxes that allow the optical fibers 14 to be coiled in circles with a large radius, and padding the optical fibers 14 and connectors 12.

DETAILED DESCRIPTION

Figure 1:
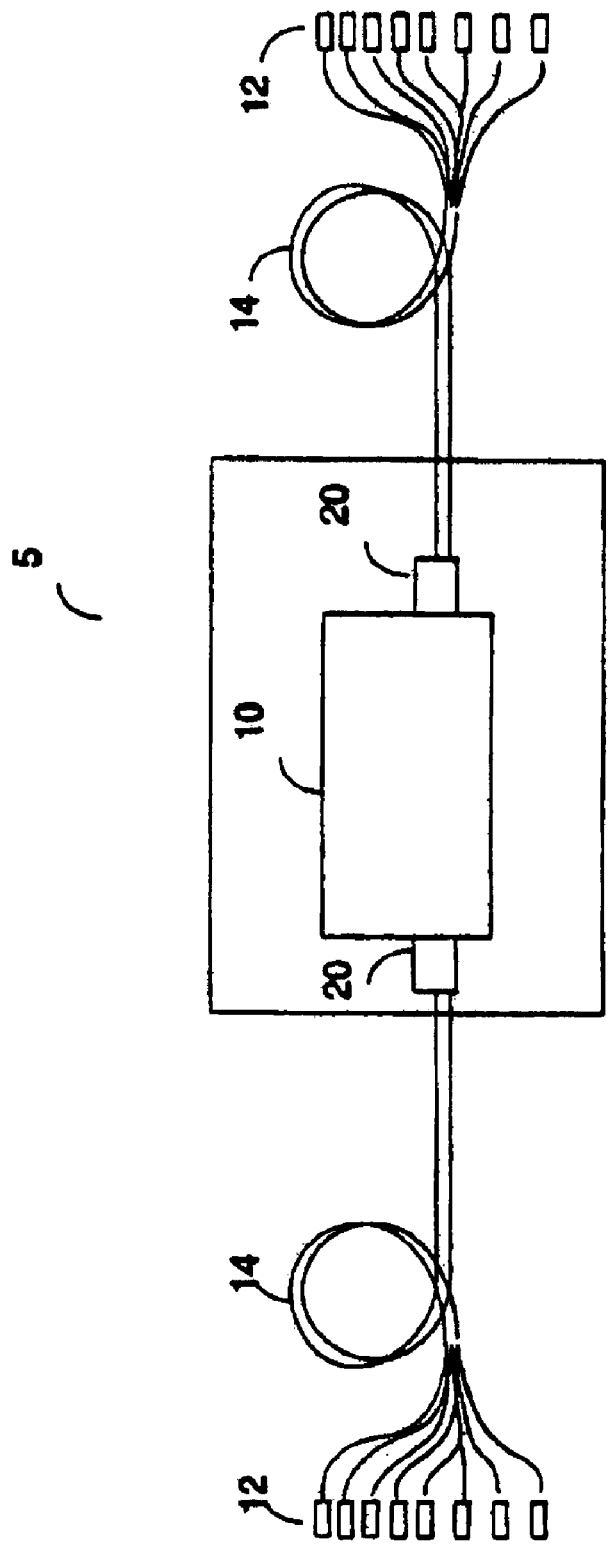
FIG. 1 is a schematic diagram that shows an example of an optical component comprising an optical circuit connected to optical connectors by optical fibers.
Figure 2:
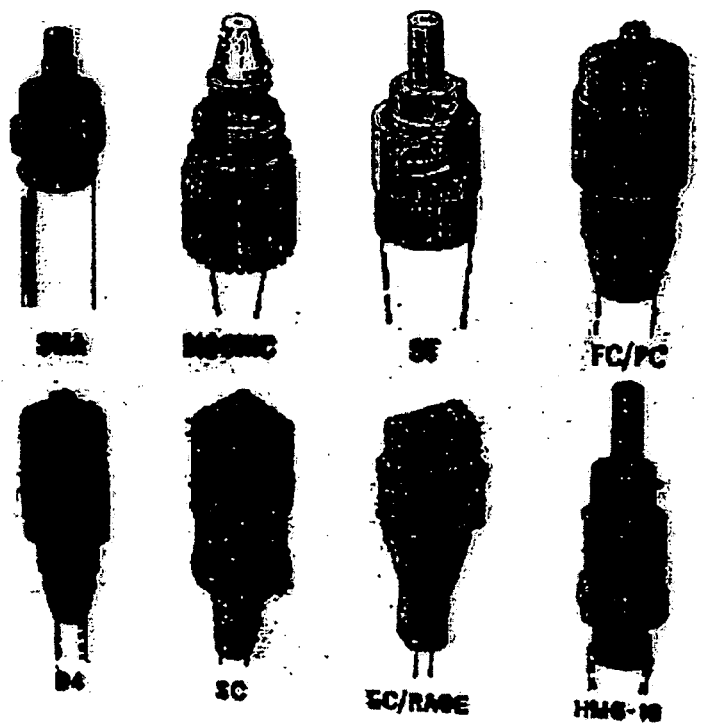
FIG. 2 is a schematic diagram that shows examples of various types of optical connectors that may be used to couple to the optical component.

An optical component has a package casing with an integrated modular optical connector. The modular optical connector allows for quick and easy coupling of the optical component to multiple optical waveguides. Because the optical component does not have fragile, long, exposed optical fibers, automation equipment may be used in the manufacture, handling, and testing of the optical component. Shipping costs are reduced by allowing smaller packaging with less protective material. Additionally, it is much quicker to hook up the optical component by using a modular connector than by connecting the individual connectors 12 of FIG. 1.

Figure 3:
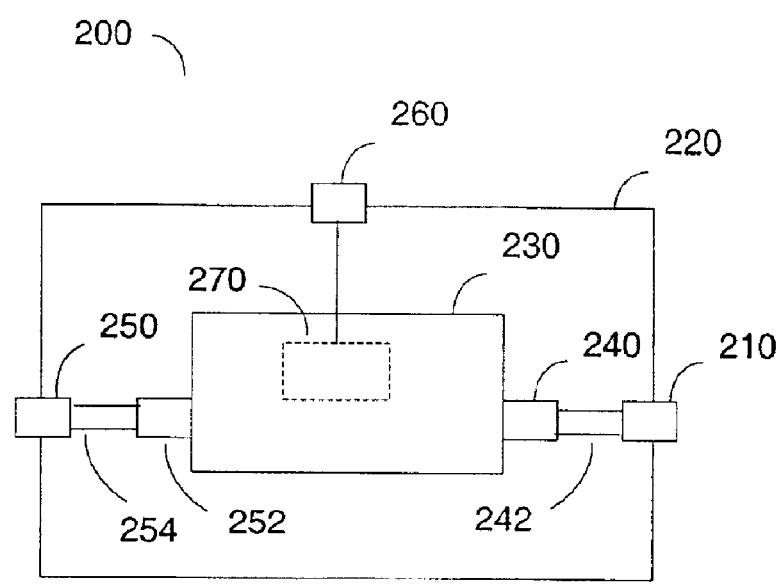
FIG. 3 is a schematic diagram that shows an embodiment of an optical component having a modular optical connector that is integrated into the package casing of the optical component.

FIG. 3 is a schematic diagram that shows an embodiment of an optical component 200 having a modular optical connector 210 that is integrated into the package casing 220 of the optical component 200. The optical component 200 comprises an optical circuit 230 enclosed within the package casing 220. The optical circuit 230 may be any of various optical devices, such as array waveguide grating (AWG) filters, optical add/drop (de)multiplexers, optical switches, as well as hybrid opto-electronic integration devices. In one embodiment, the optical circuit 230 is a PLC, however, alternatively, the optical circuit 230 may comprise optical fibers.

In one embodiment, the optical circuit is coupled to the modular optical connector 210 via a V-groove substrate 240 and a fiber ribbon cable 242. The modular optical connector 210 allows simultaneous connection of multiple optical waveguides or optical fibers within the modular optical connector 210 when attached to a mating optical connector.

In one embodiment, the modular optical connector 210 is manufactured with tight tolerances such that a mating connector will provide a good optical interface with low losses. In some cases, additional alignment techniques may be used, such as having alignment pins in one connector, and corresponding alignment holes in the mating connector.

Figure 4:
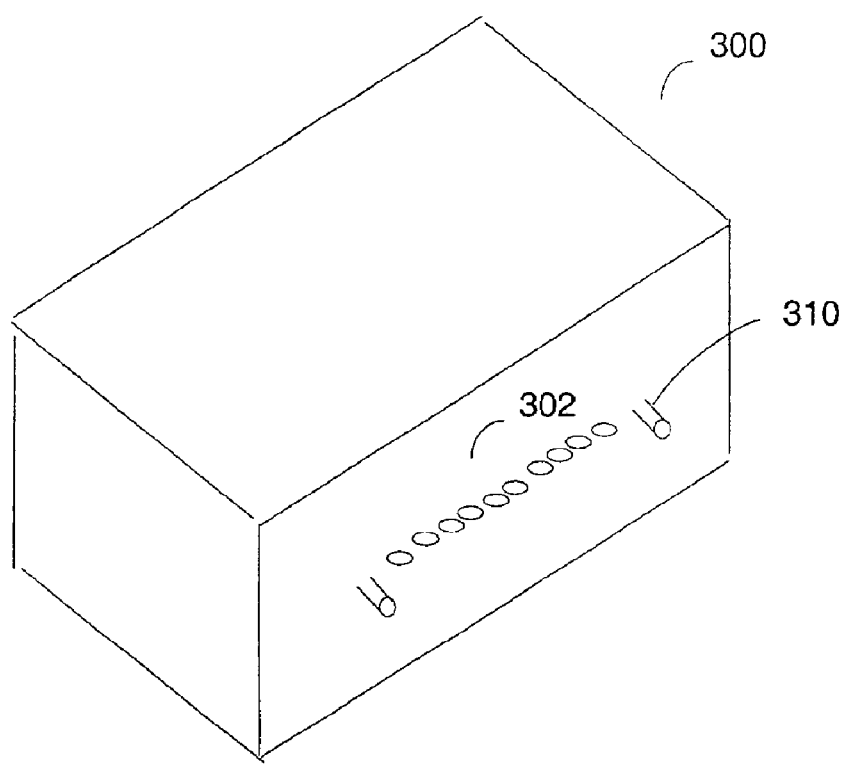
FIG. 4 is a schematic diagram that shows one example of a modular optical connector that has multiple optical waveguides embedded within it.

FIG. 4 is a schematic diagram that shows one example of a modular optical connector 300 that has multiple optical waveguides embedded within it. In one embodiment, the optical waveguides may comprise optical fiber. The optical waveguides terminate at an end of the modular optical connector 300 to provide multiple optical interfaces 302. Alignment pins 310 may assist with aligning the modular optical connector 300 with a mating modular optical connector. In one embodiment, the mating optical connector has a housing sheath that substantially fits around the perimeter of the modular optical connector 300, and has corresponding optical waveguides that butt-couple to the multiple optical interfaces 302 of the modular optical connector 300.

Returning to FIG. 3, in one embodiment, the optical circuit 230 is coupled to a second modular connector 250 by a second V-groove substrate 252 and fiber ribbon cable 254. The second modular connector 250 is integrated into the package casing 220. In one embodiment, all input to the optical component 200 is provided by one of the modular connectors 210, 250 and the other modular connector provides output optical signals from the optical component 200. In an alternate embodiment, input and output optical signals are freely intermingled among multiple modular connectors.

In one embodiment, an electrical connector 260 is integrated into the package casing 220. The electrical connector 260 includes electrical interfaces that may provide data, control, and/or status signals to the optical component 200. In one embodiment, the optical circuit 230 is kept at a constant temperature using a temperature regulator 270 such as a heater or thermoelectric cooler (TEC) that receives power, control, and status signals through the electrical connector 260.

Figure 5:
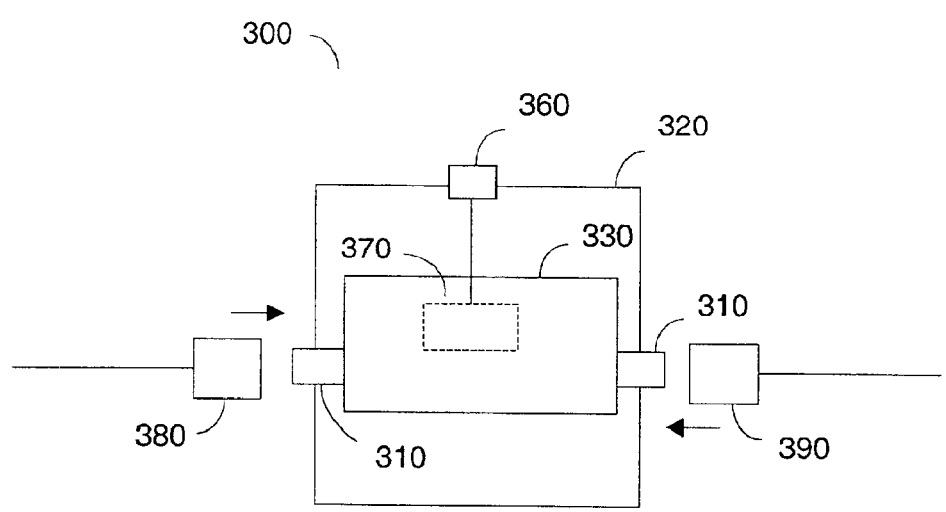
FIG. 5 is a schematic diagram that shows another embodiment of an optical component having a modular optical connector that is integrated into the package casing of the optical component.

FIG. 5 is a schematic diagram that shows another embodiment of an optical component 300 having one or more modular optical connectors 310 that are integrated into the package casing 320 of the optical component.

In this embodiment, the integrated optical connector is coupled directly to the optical circuit 330 without the use of a fiber ribbon cable as in the embodiment of FIG. 3. The integrated optical connectors 310 may comprise two V-groove substrates sandwiching optical waveguides, and may be coupled to the optical circuit, by various ways such as by butt-coupling. In one embodiment, the integrated optical connector may at least partially comprise Pyrex or silicon.

An electrical connector 360 may provide electrical signals to a temperature regulator 370. In one embodiment, a first mating integrated optical receptacle 380 is coupled to an integrated optical connector 310 to provide input optical signals to the optical circuit 330 through a first plurality of optical interfaces, and a second mating integrated optical receptacle 390 is coupled to another integrated optical connector 310 to receive output optical signals from the optical circuit 330 through a second plurality of optical interfaces. The optical receptacles 380 and 390 allow input and output to other optical equipment, such as networks, test equipment, and so forth.

Thus, an optical component having a package casing with an integrated modular optical connector is disclosed. However, the specific embodiments and methods described herein are merely illustrative. Numerous modifications in form and detail may be made without departing from the scope of the invention as claimed below. The invention is limited only by the scope of the appended claims.

What is claimed is:

1. An optical circuit package comprising:
   an optical circuit having an optical input and an optical output; and
   a package casing, the package casing having a first integrated modular optical connector coupled to the optical input, the integrated modular optical connector comprising multiple optical interfaces, and a second integrated modular optical connector coupled to the optical output.

2. The optical circuit package of claim 1 further comprising:
   an electrical connector having multiple electrical interfaces.

3. The optical circuit package of claim 1 further comprising:
   a V-groove substrate coupled to the optical circuit; and
   an optical ribbon cable coupling the V-groove substrate to the integrated modular optical connector.

4. The optical circuit package of claim 1, wherein the optical circuit is a planar lightwave circuit.

5. The optical circuit package of claim 4, wherein the optical circuit comprises an array waveguide grating, an optical multiplexer, an optical demultiplexer, or an optical switch.

6. The optical circuit package of claim 5 further comprising: a temperature regulator that regulates the temperature of the optical circuit; and an electrical connector integrated Into the package casing, the electrical connector coupled to provide electrical control signals to the temperature regulator.

7. The optical circuit package of claim 1, wherein the optical circuit comprises one or more optical fibers.

8. The optical circuit package of claim 1, wherein the first integrated modular optical connector is directly coupled to the optical input.

9. A method of making an optical circuit package comprising:
   providing an optical circuit substrate having an optical input and an optical output
   aligning a first V-groove substrate to the optical input of the optical circuit substrate, the V-groove substrate coupled to a first modular optical connector;
   affixing the first V-groove substrate to the optical input of the optical circuit substrate;
   integrating the second modular optical connector into the housing of the optical circuit package, wherein the second modular optical connector has multiple optical interfaces;
   aligning a second V-groove substrate to the outout of the optical circuit substrate, the second V-groove substrate coupled to a second modular optical connector;
   affixing the second V-groove substrate to the output of the optical circuit substrate; and
   integrating the second modular optical connector into the housing of the optical circuit package, wherein the second modular optical connector has multiple optical interfaces.

10. The method of claim 9 further comprising:
    electrically coupling an electrical connector to a temperature regulator housed within the optical circuit package.

11. The method of claim 9, wherein the first V-groove substrate is part of the first modular optical connector and the second V-groove substrate is part of the second modular optical connector.

12. A method of operating an optical circuit housed within an optical circuit package having first and second integrated modular optical connectors, the method comprising:
    coupling a mating modular optical receptacle to the first integrated modular optical connector to provide a first plurality of optical interfaces;
    providing an optical input to the optical circuit through the first plurality of optical interfaces; and
    receiving an optical output from the optical circuit through a second plurality of optical interfaces comprising a second modular optical connector and a second mating modular optical receptacle, the second modular optical connector integrated into the optical circuit package.

13. The method of claim 12 further comprising:
    providing electrical signals to the optical circuit.

14. The optical circuit package of claim 1, wherein the second integrated modular optical connector is directly coupled to the optical output. circuit package.

* * * * *

UNITED STATES PATENT AND TRADEMARK OFFICE
CERTIFICATE OF CORRECTION

| | | |
|---|---|---|
| PATENT NO. | : 6,860,642 B2 | Page 1 of 1 |
| APPLICATION NO. | : 10/099110 | |
| DATED | : March 1, 2005 | |
| INVENTOR(S) | : Vodrahalli et al. | |

It is certified that error appears in the above-identified patent and that said Letters Patent is hereby corrected as shown below:

Column 1, at line 13, delete "(PLCS)" and insert --(PLCs)--.
Column 4, at line 25, delete "second" and insert --first--.
Column 4, at line 25, delete the second occurrence of "the" and insert --a--.
Column 4, at line 27, delete "second".
Column 4, at line 30, delete "outout" and insert --output--.
Column 4, at line 65, delete "circuit package.".

Signed and Sealed this

Twelfth Day of June, 2007

JON W. DUDAS
*Director of the United States Patent and Trademark Office*